United States Patent [19]

Kaneko et al.

[11] Patent Number: 5,130,386

[45] Date of Patent: * Jul. 14, 1992

[54] METHOD OF PREVENTING POLYMER SCALE DEPOSITION DURING POLYMERIZATION

[75] Inventors: Ichiro Kaneko, Hazaki; Toshihide Shimizu, Urayasu; Susumu Ueno, Hazaki; Mikio Watanabe, Kamisu, all of Japan

[73] Assignee: Shin-Etsu Chemical Co., Ltd., Tokyo, Japan

[*] Notice: The portion of the term of this patent subsequent to Aug. 6, 2008 has been disclaimed.

[21] Appl. No.: 486,826

[22] Filed: Mar. 1, 1990

[30] Foreign Application Priority Data

Mar. 2, 1989 [JP] Japan ................................. 1-50679

[51] Int. Cl.$^5$ ............................................. C08F 2/00
[52] U.S. Cl. ..................................... 526/62; 526/210; 422/131
[58] Field of Search ............... 526/74, 62, 74, 210; 422/131

[56] References Cited

U.S. PATENT DOCUMENTS

| | | |
|---|---|---|
| 4,105,840 | 8/1978 | Cohen . |
| 4,182,809 | 8/1980 | Hong et al. . |
| 4,267,291 | 5/1981 | Jones et al. ............................ 526/62 |
| 4,272,622 | 6/1981 | Kitamura et al. ................... 526/342 |

FOREIGN PATENT DOCUMENTS

| | | |
|---|---|---|
| 0008799 | 3/1980 | European Pat. Off. . |
| 0320227 | 6/1989 | European Pat. Off. . |
| 8100685 | 3/1981 | World Int. Prop. O. . |

OTHER PUBLICATIONS

Patent Abstracts of Japan, vol. 12, No. 426 (C-542)[3273], Nov. 10, 1988; & JP-A-63 156 801 (SHIN ETSU CHEM. CO., LTD) 29-06-1988.

Primary Examiner—Joseph L. Schofer
Assistant Examiner—Tom Weber
Attorney, Agent, or Firm—Oblon, Spivak, McClelland, Maier & Neustadt

[57] ABSTRACT

A method of preventing polymer scale deposition in a polymerization vessel during polymerization of a monomer having an ethylenically double bond, wherein said polymerization is carried out in a polymerization vessel of which the inner wall has been previously coated with a coating solution containing (A) a tannin, and
(B) a water-soluble polymeric compound, followed by drying to form a coating; a scale preventive agent comprising the components (A) and (B); and a polymerization vessel having said coating on the inner wall thereof. Polymer scale deposition on the inner wall, etc. of the polymerization vessel can be effectively prevented.

13 Claims, No Drawings

METHOD OF PREVENTING POLYMER SCALE DEPOSITION DURING POLYMERIZATION

BACKGROUND OF THE INVENTION

1. Field of the Invention

The present invention relates to a method of preventing polymer scale deposition on the inner wall and so forth of a polymerization vessel during polymerization of a monomer having an ethylenically double bond.

2. Description of Prior Art

In processes of preparing polymers by polymerizing a monomer in a polymerization vessel, the problem that polymers deposit on the inner wall and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer, there is a danger that the workers may be exposed to the unreacted monomer, which may give them some physical disorders.

Heretofore, there are known methods for preventing polymer scale deposition in which the inner wall and so forth are coated with various materials that act as polymer scale preventive agents, for example, particular polar compounds (Japanese Patent Publication (KOKOKU) No. 30343/1970); dyes or pigments (Japanese Patent Publication (KOKOKU) Nos. 30835/1970 and 24953/1977); an aromatic amine compound (Japanese Pre-examination Patent Publication (KOKAI) No. 50887/1976); a reaction product of a phenolic compound with an aromatic aldehyde (Japanese Pre-examination Patent Publication (KOKAI) No. 54317/1980).

These methods are effective in preventing polymer scale deposition, in the case where the monomer to be polymerized is vinyl halide such as vinyl chloride or a monomer mixture containing a large amount of vinyl halide and a small amount of other monomers copolymerizable therewith. However, the scale-preventing effect achieved varies depending on polymerization conditions such as the kind of monomers, the ratio of materials charged in the polymerization vessel, the kind of a polymerization catalyst, and the material of the inner wall of a polymerization vessel; it is difficult to prevent the scale deposition effectively and certainly. Specifically, when a polymerization catalyst with a strong oxidative effect such as potassium persulfate, acetylcyclohexylsulfonyl peroxide and di-2-ethoxyethyl peroxydicarbonate is used, the scale preventive agent forming the coating may be oxidized, so that the scale preventing effect is impaired. In the case of polymerization vessels with inner wall made of stainless steel or other steels, polymer scale deposition is liable to occur as compared with vessels lined with glass. Emulsion polymerization is liable to form polymer scale deposition as compared with suspension polymerization.

Of the scale preventive agents used in the above methods, the dyes and pigments described in Japanese Patent Publication (KOKOKU) No. 30835/1970 and 24953/1977, the aromatic amine compounds described in Japanese Pre-examination Patent Publication (KOKAI) No. 50887/1976, the reaction products of a phenolic compound with an aromatic aldehyde described in Japanese Pre-examination Patent Publication (KOKAI) No. 54317/1980 are colored and therefore possibly have a disadvantage of putting a color to product polymers.

Aniline, nitrobenzene, formaldehyde, etc. of the polar organic compounds described in Japanese Patent Publication (KOKOKU) No. 30343/1970, and the pigments containing a heavy metal such as chromium and lead described in Japanese Patent Publication (KOKOKU) No. 30835/1970 are poisonous. The dyes described in Japanese Patent Publication (KOKOKU) Nos. 30835/1970 and 24953/1977 include dyes that involve some concern about carcinogenesis. These substances may cause serious problems from viewpoint of safety in work operations.

SUMMARY OF THE INVENTION

Accordingly, it is an object of the present invention to provide a method of preventing polymer scale deposition effectively and certainly under any conditions as to the kind of monomer, etc., with no concern about safety.

The present inventors have discovered that the above object can be achieved by coating the inner wall of a polymerization vessel with a coating solution having a particular composition.

Thus, the present invention provides, as a means of solving the prior art problems, a method of preventing polymer scale deposition in a polymerization vessel during polymerization of a monomer having an ethylenically double bond, wherein said polymerization is carried out in a polymerization vessel of which the inner wall has been previously coated with a coating solution containing (A) a tannin, and
(B) a water-soluble polymeric compound, followed by drying to form a coating.

The present invention also provides a polymerization vessel of which the inner wall has a coating formed as described above.

Further, the present invention provides a polymer scale preventive agent comprising said components (A) and (B).

According to the present invention, polymer scale deposition can be effectively and certainly prevented in the polymerization of monomers having an ethylenically double bond, irrespectively of the polymerization conditions such as the kind of monomers, ratio of materials charged, the material of the inner wall of polymerization vessels, etc. For example, even in the case of polymerizing monomers by suspension polymerization, emulsion polymerization, bulk polymerization, solution polymerization or gas phase polymerization, or in the case of polymerizing in a stainless steel or glass-lined polymerization vessel, or in the case of using a polymerization catalyst having a strong oxidative effect, polymer scale deposition can be effectively and certainly prevented. Therefore, the operation of removing polymer scale is not required to be conducted every polymerization run; hence productivity is markedly improved. And polymers of high quality can be produced stably. In addition, the scale-preventive agent used is safe in work operations.

DETAILED DESCRIPTION OF PREFERRED EMBODIMENTS

Components of the Coating Solution (A) Tannins

The tannin used as the component (A) includes, for example, hydrolyzable tannins such as tannic acid, Chinese gallotannin, nutgalls tannin, sumac tannin, tara tannin, valonia tannin, chestnut tannin, myrobalan tannin, oak tannin, divi-divi tannin, algarobillatannin and the like, and condensed tannins such as gambier tannin, quebracho-tannin, mimosa tannin, mangrove tannin, hemlock tannin, spruce tannin, Burma cutch tannin, oak bark tannin, tannin of persimmon or shibuol and the like. These can be used singly or in combination of two or more. Among the tannins, preferred are tannic acid, Chinese gallotannin, nutgalls tannin, quebracho-tannin, mimosa tannin, oak bark tannin and tannin of persimmon or shibuol.

(B) Water-soluble polymeric compounds

The water-soluble polymeric compound used as the component (B) includes, for example, cationic polymeric compounds, anionic polymeric compounds, amphoteric polymeric compounds and hydroxyl group-containing polymeric compounds. Particularly preferred are hydroxyl group-containing polymeric compounds and amphoteric polymeric compounds.

Cationic polymeric compound

The cationic polymeric compound includes cationic polymeric electrolytes having a nitrogen atom with positive electric charge in the side chain, including, for example, polyvinylamines, polyethyleneamines, polyethyleneimines, polyacrylamides, N-vinyl-2pyrrolidone/acrylamide copolymer, cyclized polymers of dimethyldiamylammonium chloride, cyclized polymers of dimethyldiethylammonium bromide, cyclized polymers of diallylamine hydrochloride, cyclized copolymers of dimethyldiallylammonium chloride and sulfur dioxide, polyvinylpyridines, polyvinylpyrrolidones, polyvinylcarbazoles, polyvinylimidazolines, polydimethylaminoethyl acrylates, polydimethylaminoethyl methacrylates, polydiethylaminoethyl acrylates, and polydiethylaminoethyl methacrylates.

Among these cationic polymeric compounds, polyvinylamines, polyvinylcarbazoles, polyacrylamides and polyvinylpyrrolidones are preferred.

Anionic polymeric compounds

The anionic polymeric compound which may be used includes, for example, anionic polymeric compounds having a carboxyl group or sulfonic acid group in the side chain as exemplified by sulfomethylated compounds of polyacrylamide, polyacrylic acid, alginic acid, an acrylamide/vinylsulfonic acid copolymer, polymethacrylic acid and polystyrenesulfonic acid, or alkali metal salts or ammonium salts of these, and carboxymethyl cellulose.

Among the above anionic polymeric compounds, preferred are polyacrylic acid, alginic acid, polymethacrylic acid, polystyrenesulfonic acid.

Amphoteric polymeric compounds

The amphoteric polymeric compounds which may be used include, for example, glue, gelatin, casein, and albumin. Of these, gelatin and albumin are preferred.

Hydroxyl group-containing polymeric compounds

The hydroxyl group-containing polymeric compound includes, for example, starches and derivatives thereof such as amylose, amylopectin, dextrin, oxidized starch, acetyl starch, nitrostarch, methyl starch, and carboxymethyl starch; hydroxyl group-containing plant fluid substances such as pectic acid, protopectin, pectinic acid, laminarin, fucoidin, agar, and carrageenan; hydroxyl group-containing animal viscous fluid materials such as hyaluronic acid, chondroitin sulfuric acid, heparin keratosulfuric acid, chitin, charonin sulfuric acid; nucleic acids such as ribonucleic acid and deoxyribonucleic acid; cellulose derivatives such as methyl cellulose, ethyl cellulose, glycol cellulose, benzyl cellulose, cyanoethyl cellulose, cellulose methylene ether, triphenyl cellulose, formyl cellulose, cellulose acetate, cellulose propionate, cellulose butyrate, cellulose acetate propionate, cellulose sulfonate ester, cellulose carbamate ester, nitrocellulose, cellulose phosphate, and cellulose xanthogenate; hemicelluloses such as xylan, mannan, arabogalactan, galactan, and araban; lignins such as alcohol lignin, dioxane lignin, phenol lignin, hydrotropic lignin, mercaptolignine, thioglycollic acid lignin, lignin sulfonic acid, alkali lignin, thioalkali lignin, acid lignin, cuproxam lignin, and periodate lignin; phenol-formaldehyde resins, partially saponified polyvinyl alcohols, and polyvinyl alcohol.

Among these, preferred are amylopectin, pectic acid, pectinic acid, agar, chitin, methyl cellulose, carboxymethyl cellulose, glycol cellulose, alcohol lignin, lignin sulfonic acid, alkali lignin, acid lignin, polyvinyl alcohol, cellulose phosphate, and chondroitin sulfuric acid.

These water-soluble polymeric compounds may be used singly or in combination of two or more.

Preparation the Coating Solution

The coating solution can be prepared by dissolving or dispersing the component (A) and the component (B) in a suitable solvent. The total concentration of the component (A) and the component(B) may be normally from about 0.005% by weight to about 10% by weight, preferably from about 0.01 to about 5% by weight. However, the concentration is not particularly limited, as long as a desired coating weight described later is obtained. The component (B) is normally contained in an amount of from 0.1 to 1,000 parts by weight, preferably from 1 to 600 parts by weight, per 100 parts by weights of the component (A), in the coating solution. If the content of the component (B) is too large or too small relatively to the component (A), the scale preventing effect due to the combined use of the component (A) and the component (B) may not be achieved.

The solvent used for preparation of the coating solution includes, for example, water; alcohols such as methanol, ethanol, propanol, 1-butanol, 2-butanol, 2-methyl-1-propanol, 2-methyl-2-propanol, 3-methyl-1-butanol, 2-methyl-2-butanol, and 2-pentanol; ketones such as acetone, methyl ethyl ketone, and methyl isobutyl ketone; esters such as methyl formate, ethyl formate, methyl acetate, and methyl acetoacetate; ethers such as 4-methyl dioxolan, and ethylene glycol diethyl ether; and aprotic solvents such as dimethylformamide, dimethyl sulfoxide, and acetonitrile. These solvents are appropriately used singly or as a mixed solvent of two or more.

Formation of the Coating

The coating solution is applied to the inner wall surface of the polymerization vessel, thoroughly dried, and optionally washed with water as required, to form the coating having scale preventing effect. The drying of the solution applied on the inner wall may be conducted, for example, at a temperature of from room temperature to 100° C.

Preferably, the coating is also previously formed on other parts of the polymerization vessel with which the monomer comes into contact during polymerization, in addition to the inner wall. Such parts include, for example, stirring blades, a stirring shaft, a condenser, a header, baffles, search coils, bolts, nuts, etc. The coating on these parts can be formed in the same manner as described above. Particularly, stirring blades, stirring shaft, and baffles should be coated.

Moreover, preferably, the coating solution is also applied to parts of recovery system for an unreacted monomer with which the unreacted monomer may come into contact, for example, the inner surfaces of monomer distillation columns, condensers, monomer stock tanks and valves. Scale formation can be thereby prevented at these parts due to a coating thus formed.

The method of applying the coating solution is not particularly limited, and includes typically the brush coating, spray coating, the method of filing the polymerization vessel with the coating solution followed by withdrawal thereof, and automatic coating methods as disclosed in Japanese Pre-examination Patent Publication (KOKAI) Nos. 61001/1982, 36288/1980 and 11303/1984, Japanese Pre-examination Publication (KOHYO) Nos. 501116/1981 and 501117/1981. The method of drying wet coated surfaces is not limited, either. Following methods can be used. For example, a method in which, after the solution is applied, hot air with an suitable elevated temperature is blown to the coated surface, and a method in which the inner wall surface of a polymerization vessel and other parts to be coated are previously heated, and the coating solution is directly applied on the heated inner wall surface, etc. After dried, the coated surfaces are washed with water if necessary.

The coating thus formed has normally a coating weight of from 0.005 to 5 g/m$^2$, preferably from 0.05 to 2 g/m$^2$ in the dried state.

The coating operation may be conducted every 1 to ten-odd polymerization runs. The formed coating has considerably good durability and retains the scale-preventing effect; therefore the coating operation is not necessarily performed every polymerization run.

Polymerization

After the formation of the coating on the inner wall surface of a polymerization vessel, etc., polymerization is carried out in accordance with conventional procedures. That is, a monomer having an ethylenically double bond, a polymerization initiator, and other necessary additives such as a dispersing agent for the monomer, and optionally a polymerization medium are charged into the polymerization vessel, followed by carrying out polymerization.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters or salts of these; maleic acid or fumaric acid, and esters or anhydrides thereof; and diene monomers such as butadiene, chloroprene and isoprene; as well as styrene, α-methylstyrene, acrylates, acrylonitrile, halogenated vinylidenes, and vinyl ethers.

There are no particular limitations on the form of polymerization to which the method of this invention can be applied. The present invention is effective in any forms of polymerization such as suspension polymerization, emulsion polymerization, solution polymerization, bulk polymerization, and gas phase polymerization.

More specifically, in the case of suspension or emulsion polymerization, polymerization is generally carried out by a process comprising the steps of charging water and a dispersing agent into a polymerization vessel, charging a polymerization initiator, evacuating the inside of the polymerization vessel to a pressure of from about 0.1 mmHg to about 760 mmHg, charging a monomer (whereupon the pressure inside the polymerization vessel usually becomes from 0.5 to 30 kg.cm$^{-2}$), polymerizing the monomer at a temperature of from about $-10°$ C. to 150° C., and optionally adding at least one of water, a dispersing agent and polymerization initiator during polymerization. The polymerization may be judged to be completed when the pressure inside the vessel falls to from about 0 to about 7 kg.cm$^{-2}$G. The water, dispersing agent and polymerization initiator are used in amounts of about 20 to about 300 parts by weight, about 0.01 to about 30 parts by weight, and about 0.01 to about 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those as described for suspension or emulsion polymerization.

In the case of bulk polymerization, the process typically comprises the steps of evacuating the inside of a polymerization vessel to a pressure of from about 0.01 mmHg to about 760 mmHg, charging a monomer, and then charging a polymerization initiator, and then carrying out polymerization at $-10°$ C. to 250° C.

The method of this invention is effective regardless of the materials constituting the inner wall, etc. of a polymerization vessel. That is, this method is effective for any type of polymerization vessels having inner wall made of stainless steel or lined with glass.

Accordingly, any additive materials that are conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, di-2-ethylhexyl peroxydicarbonate, 3,5,5-trimethylhexanoyl peroxide, α-cumyl peroxyneodecanoate, cumene hydroperoxide, cyclohexanone peroxide, t-butyl peroxypivalate, di-2-ethoxyethyl peroxydicarbonate, benzoyl peroxide, lauroyl peroxide, 2,4-dichlorobenzoyl peroxide, diisopropyl peroxydicarbonate, acetylcyclohexylsulfonyl peroxide, α,α'-azobisisobutyronitrile, α,α'-azobis-2,4-dimethylvaleronitrile, potassium persulfate, ammonium persulfate, p-menthane hydroperoxide; suspension agents comprised of natural or synthetic polymers such as partially oxidized polyvinyl acetates, polyacrylic acids, vinyl acetate/maleic anhydride copolymer, cellulose derivatives such as hydroxypropyl cellulose, and gelatin; solid dispersants such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters.

EXAMPLES

The method of the present invention is now described by way of working examples and comparative examples. In each of the tables below, Experiment Nos. marked with * indicate comparative examples, and the other Experiment Nos., working examples of the present invention; and part(s) denotes part(s) by weight.

EXAMPLE 1

Polymerization was carried out in the following manner using a polymerization vessel with an inner capacity of 1,000 liters and having a stirrer.

In each experiment, first, a component (A) and a component (B) were dissolved in a solvent in a total concentration of 0.5 % by weight as given in Table 1 to prepare a coating solution. The coating solution was applied to the inner wall and other parts with which monomers come into contact during polymerization, such as the stirring shaft, stirring blades and baffles. Then, the wet coated surfaces were dried by heating at 60° C. for 15 min., followed by washing with water. However, Experiment Nos. 101 to 103 are comparative examples in which no coating solution was applied, or a coating solution containing either a component (A) or a component (B); Experiment 116 is another comparative example in which a coating solution containing Sudan B, Nigrosine and $Na_2SiO_4$ (weight ratio: 100/100/100) in methanol, which is one used in Experiment No. 33 described in Japanese Patent Publication (KOKOKU) No. 24953/1977, was used. The (A) tannin and (B) water soluble polymeric compound used, and the weight ratio of (A)/(B) in the coating solution, and the solvent used in each experiment are given in Table 1.

Subsequently, in the polymerization vessel thus coated, were charged 400 kg of water, 200 kg of vinyl chloride, 250 g of partially saponified polyvinyl alcohol, 25 g of hydroxypropylmethyl cellulose and 75 g of diisopropyl peroxydicarbonate. Then, polymerization was carried out at 57° C. with stirring for 6 hours. After the completion of the polymerization, the amount of polymer scale depositing on the inner wall of the polymerization vessel was measured. The coloration degree of the polymer obtained in each Experiment was measured according to the following method.

A hundred parts of a polymer, one part of a stabilizing agent TS-101 (tradename, supplied by Akishima Chemical Co.) and 0.5 g of a stabilizing agent C-100J (tradename, supplied by Katsuta Kako Co.), and 50 parts of a plasticizer DOP were kneaded at 160° C. for 5 min. with a twin roll mill, and then formed into a sheet 1 mm thick. Subsequently, this sheet was placed in a mold measuring 4 cm ×4 cm ×1.5 cm(thickness), and molded at 160° C. under 65 to 70 $kg/cm^2$ to prepare a test specimen. This test specimen was measured for a L value by reflection by means of a color and color difference meter, ND-1001DP model (Nippon Denshoku Kogyo Co.) in accordance with the method of JIS K7105. According to the method, it is considered that whiteness gets higher or coloration degree gets lower, as L value gets greater toward 100.

The results are given in Table 1.

TABLE 1

| Exp. No. | Coating solution (A) Tannin | (B) Water-soluble polymeric compound | (A)/(B) (weight ratio) | Solvent | | Amount of scale $(g/m^2)$ | L value |
|---|---|---|---|---|---|---|---|
| 101 * | — | — | — | — | | 1300 | 73 |
| 102 * | chinese gallotannin | — | 100/0 | water | | 1200 | 73 |
| 103 * | — | Pectic acid | 0/100 | " | | 1150 | 73 |
| 104 | chinese gallotannin | Pectic acid | 100/100 | " | | 0 | 73 |
| 105 | oak tannin | Gelatin | 100/50 | water/methanol | (90/10) | 0 | 72.5 |
| 106 | nutgalls tannin | Albumin | 100/200 | " | (90/10) | 1 | 73 |
| 107 | myrobalan tannin | Carboxymethyl cellulose | 100/100 | " | (50/50) | 0 | 73 |
| 108 | chinese gallotannin | Amylose | 100/100 | " | (70/30) | 1 | 73 |
| 109 | sumac tannin | Chondroitin sulfuric acid | 100/150 | " | (50/50) | 1 | 72 |
| 110 | quebracho-tannin | Polyvinyl alcohol | 100/600 | " | (50/50) | 1 | 72 |
| 111 | mimosa tannin | Alkali lignin | 100/15 | " | (50/50) | 1 | 72 |
| 112 | gambier tannin | Cellulose phosphate | 100/150 | " | (80/20) | 1 | 72.5 |
| 113 | tannin of persimmon or shibuol | Polyvinylcarbazole | 100/200 | " | (80/20) | 3 | 71 |
| 114 | hemlock tannin | Polyacrylic acid | 100/10 | " | (80/20) | 1 | 72.5 |
| 115 | spruce tannin | Carrageenan | 100/50 | " | (80/20) | 1 | 72.5 |
| 116 * | (Coating solution of Exp. No. 33 in Japanese Patent Publication (KOKOKU) No. 24953/1977) | | — | — | | 10 | 65 |

EXAMPLE 2

In each experiment, a polymerization vessel with an inner capacity of 20 liters and having a stirrer was coated with a coating solution, followed by drying in the same manner as in Example 1, except that the coating solution was used in which (A) a tannin, (B) a water-soluble polymeric compound, a solvent, and the weight ratio of (A)/(B) were as given in Table 2. However, Experiment No. 201 to 203 are comparative examples in which no coating solution was coated or a coating solution containing either a component (A) or a component (B).

Subsequently, in the polymerization vessel thus coated, were charged 9 kg of water, 225 g of sodium dodecylbenzenesulfonate, 12 g of t-dodecyl mercaptan, and 13 g of potassium persulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale depositing on the inner wall of the polymerization vessel was measured. The results are given in Table 2.

TABLE 2

| Exp. No. | Coating solution (A) Tannin | (B) Water-soluble polymeric compound | (A)/(B) (weight ratio) | Solvent | | Amount of scale (g/m²) |
|---|---|---|---|---|---|---|
| 201 * | — | — | — | — | | 400 |
| 202 * | chinese gallotannin | — | 100/0 | water | | 390 |
| 203 * | — | Pectic acid | 0/100 | " | | 390 |
| 204 | chinese gallotannin | Pectic acid | 100/100 | " | | 1 |
| 205 | nutgalls tannin | Gelatin | 100/50 | " | | 1 |
| 206 | oak tannin | Carboxymethyl cellulose | 100/100 | water/methanol | (90/10) | 0 |
| 207 | mimosa tannin | Polyacrylamide | 100/150 | " | (90/10) | 2 |
| 208 | nutgalls tannin | Ethyl cellulose | 100/150 | " | (70/30) | 1 |
| 209 | tannin of persimmon or shibuol | Sodium alginate | 100/200 | " | (70/30) | 0 |

We claim:

1. A method of preventing polymer scale deposition in a polymerization vessel during polymerization of a monomer having an ethylenically double bond, wherein said polymerization is carried out in a polymerization vessel of which the inner wall has been previously coated with a coating solution containing
   (A) a tannin, and
   (B) at least one member selected from the group consisting of anionic polymeric compounds, amphoteric polymeric compounds, and hydroxyl group-containing polymeric compounds, followed by drying to form a coating.

2. The method according to claim 1, wherein said tannin is selected from the group consisting of tannic acid, Chinese gallotannin, nutgalls tannin, quebrachotannin, mimosa tannin, oak bark tannin and tannin of persimmon.

3. The method according to claim 1, wherein said water-soluble polymeric compound comprises at least one compound selected from the group consisting of polyacrylic acid, alginic acid, polymethacrylic acid, polystyrenesulfonic acid, glue, gelatin, casein, albumin, amylopectin, pectic acid, pectinic acid, agar, chitin, methyl cellulose, carboxymethyl cellulose, glycol cellulose, alcohol lignin, lignin sulfonic acid, alkali lignin, acid lignin, polyvinyl alcohol, cellulose phosphate, and chondroitin sulfuric acid.

4. The method according to claim 1 wherein said coating solution contains the component (B) in an amount of from 0.1 to 1,000 parts by weight per 100 parts by weight of the component (A).

5. The method according to claim 1, wherein said coating solution contains the component (A) and the component (B) in a total concentration of from 0.005 to 10% by weight.

6. The method according to claim 1, wherein said coating has a coating weight of from 0.005 to 5 gm².

7. The method according to claim 1, wherein said coating has been also previously formed on parts of the polymerization vessel with which the monomer comes into contact during polymerization other than its inner wall surface.

8. The method according to claim 7, wherein said parts with which the monomer comes into contact are selected from the group consisting of a stirring shaft, stirring blades, baffles, headers, search coils and condensers.

9. The method according to claim 1, wherein said coating has been further previously formed at parts of the recovery system of an unreacted monomer with which the monomer comes into contact during polymerization.

10. The method according to claim 1, wherein the monomer is at least one member selected from the group consisting of vinyl halides; vinyl esters; acrylic acid and methacrylic acid, or esters or salts of these; maleic acid or fumaric acid, and esters or anhydrides thereof; diene monomers; aromatic vinyl compounds; acrylates; acrylonitrile; halogenated vinylidenes; and vinyl ethers.

11. The method according to claim 1, wherein said polymerization is carried out as suspension polymerization, emulsion polymerization, solution polymerization, bulk polymerization, or gas phase polymerization.

12. A polymer scale preventive agent comprising: (A) a tannin and (B) a water-soluble polymeric compound.

13. A polymerization vessel of which the inner wall has a coating formed by applying a coating solution containing (A) a tannin and (B) a water-soluble polymeric compound to the inner wall, and then drying the applied solution.

* * * * *